United States Patent
Brown et al.

(10) Patent No.: US 12,158,183 B2
(45) Date of Patent: Dec. 3, 2024

(54) THRUST BEARING CAGE WITH DUAL PILOTING FLANGES AND OIL INLET CHANNELS

(71) Applicant: Schaeffler Technologies AG & Co. KG, Herzogenaurach (DE)

(72) Inventors: James Brown, Rock Hill, SC (US); Dennis Roffe, Fort Mill, SC (US); Joseph T. Griffin, Monroe, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 101 days.

(21) Appl. No.: 18/073,933

(22) Filed: Dec. 2, 2022

(65) Prior Publication Data
US 2024/0183398 A1    Jun. 6, 2024

(51) Int. Cl.
*F16C 33/46* (2006.01)
*F16C 19/30* (2006.01)

(52) U.S. Cl.
CPC ........ *F16C 33/4605* (2013.01); *F16C 19/305* (2013.01)

(58) Field of Classification Search
CPC .... F16C 19/305; F16C 19/32; F16C 33/4605; F16C 33/4617; F16C 33/4629; F16C 33/4635
See application file for complete search history.

(56) References Cited

U.S. PATENT DOCUMENTS

| | | | | |
|---|---|---|---|---|
| 3,031,239 A * | 4/1962 | Pitner | ..................... | F16C 19/55 384/623 |
| 3,090,109 A * | 5/1963 | White | .................... | F16C 33/547 29/725 |
| 3,811,744 A * | 5/1974 | Wren | ..................... | F16C 33/761 384/623 |
| 6,116,787 A * | 9/2000 | Muntnich | ............. | F16C 33/588 384/621 |
| 7,845,857 B2 * | 12/2010 | Shattuck | ............. | F16C 33/6681 384/619 |
| 9,933,010 B2 * | 4/2018 | Brown | ..................... | F16C 19/55 |
| 2023/0058652 A1 * | 2/2023 | Griffin | ................ | F16C 33/6681 |

FOREIGN PATENT DOCUMENTS

WO    2021118879 A1    6/2021

* cited by examiner

*Primary Examiner* — James Pilkington

(57) ABSTRACT

A cage assembly for a bearing includes a first cage half and a second cage half. The first cage half includes a first annular section with a first plurality of circumferentially spaced apertures for receiving a plurality of rolling elements, and a first cylindrical section arranged for positioning the cage assembly on a first shaft. The second cage half includes a second annular section with a second plurality of circumferentially spaced apertures for receiving the plurality of rolling elements, and a second cylindrical section arranged for positioning the cage assembly on a second shaft. In an example embodiment, the first cylindrical section or the second cylindrical section has an aperture for radial flow of a lubricant.

15 Claims, 1 Drawing Sheet

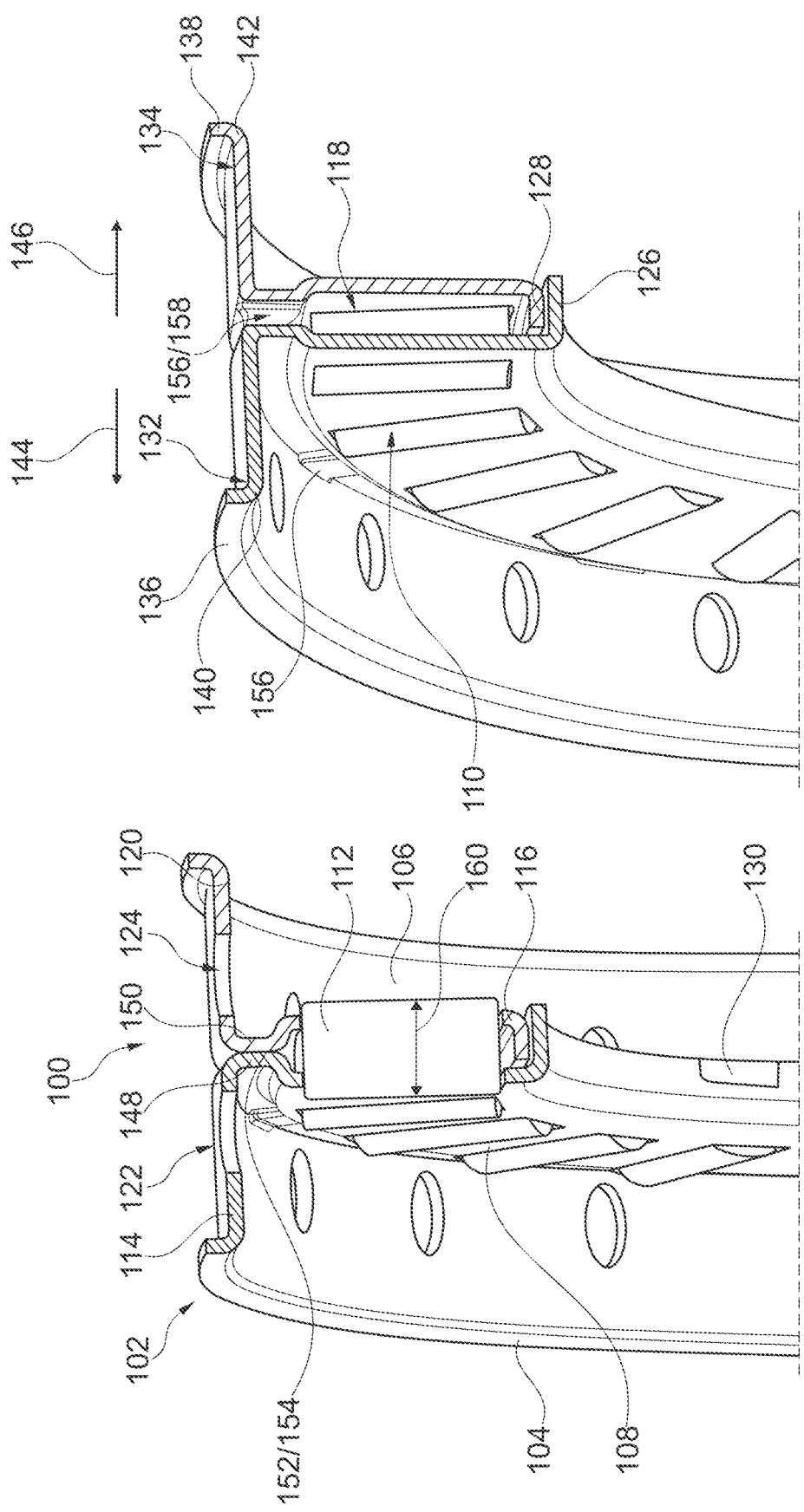

THRUST BEARING CAGE WITH DUAL PILOTING FLANGES AND OIL INLET CHANNELS

TECHNICAL FIELD

The present disclosure relates generally to a thrust bearing cage, and more specifically to a thrust bearing cage with dual piloting flanges and oil inlet channels.

BACKGROUND

Thrust bearing cages with a piloting flange are known from commonly-assigned PCT International Publication No. WO 2021/118879 titled THRUST BEARING CAGE WITH PILOTING FLANGE to Griffin et al., hereby incorporated by reference as if set forth fully herein.

SUMMARY

Example embodiments broadly comprise a cage assembly for a bearing including a first cage half and a second cage half. The first cage half includes a first annular section with a first plurality of circumferentially spaced apertures for receiving a plurality of rolling elements, and a first cylindrical section arranged for positioning the cage assembly on a first shaft. The second cage half includes a second annular section with a second plurality of circumferentially spaced apertures for receiving the plurality of rolling elements, and a second cylindrical section arranged for positioning the cage assembly on a second shaft. In an example embodiment, the first cylindrical section or the second cylindrical section has an aperture for radial flow of a lubricant.

In some example embodiments, the first cage half has a third cylindrical section and the second cage half has a fourth cylindrical section, axially overlapping the third cylindrical section. In an example embodiment, a one of the third cylindrical section or the fourth cylindrical section has a depressed portion for securing the one of the third cylindrical section or the fourth cylindrical section to the other of the third cylindrical section or the fourth cylindrical section.

In some example embodiments, the first cylindrical section and the second cylindrical section are radially outer cylindrical sections, and the third cylindrical section and the fourth cylindrical section are radially inner cylindrical sections. In some example embodiments, the first cylindrical section or the second cylindrical section includes a distal end with a radially extending flange. In an example embodiment, the cage assembly includes a radius portion connecting the radially extending flange to the distal end. The radius portion is arranged for providing a lead in to align the first cylindrical section with the first shaft or to align the second cylindrical section with the second shaft.

In some example embodiments, the first cylindrical section extends in a first axial direction and the second cylindrical section extends in a second axial direction, opposite the first axial direction. In an example embodiment, the third cylindrical section extends in the second axial direction and the fourth cylindrical section extends in the first axial direction. In an example embodiment, the first annular section is axially spaced away from the second annular section to create an annular gap therebetween.

In some example embodiments, the first cage half also has a first annular portion connecting the first annular section with the first cylindrical section, and the first annular portion has a first annular surface contacting the second cage half, or the second cage half also includes a second annular portion connecting the second annular section with the second cylindrical section, and the second annular portion has a second annular surface contacting the first cage half. In an example embodiment, the first annular portion has a plurality of circumferentially spaced first annular portions with radial lubricant channels therebetween, or the second annular portion has a plurality of circumferentially spaced second annular portions with radial lubricant channels therebetween.

In some example embodiments, the first cage half also has a first annular portion connecting the first annular section with the first cylindrical section, and the first annular portion has a first annular surface contacting the second cage half, and the second cage half also includes a second annular portion connecting the second annular section with the second cylindrical section, and the second annular portion has a second annular surface contacting the first cage half. In an example embodiment, the first annular portion has a plurality of circumferentially spaced first annular portions with radial lubricant channels therebetween, and the second annular portion has a plurality of circumferentially spaced second annular portions with radial lubricant channels therebetween.

Other example aspects broadly comprise a bearing including the cage assembly and the plurality of rolling elements disposed in the first plurality of circumferentially spaced apertures and the second plurality of circumferentially spaced apertures. In an example embodiment, each one of the plurality of rolling elements has a diameter, each of the first plurality of circumferentially spaced apertures has a respective circumferential length, less than the diameter; and each of the second plurality of circumferentially spaced apertures has a respective circumferential length, less than the diameter. In an example embodiment, the plurality of rolling elements are arranged to contact respective end faces of the first shaft and the second shaft. In an example embodiment, the plurality of rolling elements are cylindrical rollers or needle rollers.

BRIEF DESCRIPTION OF THE DRAWINGS

FIG. 1 illustrates a cross-sectional perspective view of a bearing according to an example embodiment.

FIG. 2 illustrates an alternative cross-sectional perspective view of the bearing of FIG. 1.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

The following description is made with reference to FIGS. 1-2. FIG. 1 illustrates a cross-sectional perspective view of bearing 100. FIG. 2 illustrates an alternative cross-sectional perspective view of the bearing of FIG. 1. Bearing 100 includes bearing cage assembly 102 including cage half 104 and cage half 106. Cage half 104 includes annular section 108 with circumferentially spaced apertures 110 for receiving rolling elements 112, and cylindrical section 114 arranged for positioning the cage assembly on a first shaft (not shown). Similarly, cage half 106 includes annular section 116 with circumferentially spaced apertures 118 for receiving rolling elements 112, and cylindrical section 120 arranged for positioning the cage assembly on a second shaft (not shown). As shown in FIGS. 1-2, rolling elements 112 are needle rollers although other rolling elements (e.g., cylindrical rollers, balls or tapered rollers) are possible.

By positioning on a shaft, we mean that, when bearing 100 is installed on a shaft with an outer diameter less than an inner diameter of the cylindrical section, the shaft will support the bearing so that its position is maintained relative to the shaft. In another embodiment (not shown), the cylindrical sections may be positioned inside a bore of the shaft, for example, with a diameter less than a bore diameter of the shaft. By providing two cylindrical sections on either axial side of the bearing, orientation of the bearing relative to the shaft is irrelevant. In other words, should the bearing be positioned on a single shaft (e.g., a shaft on only one side of the bearing), it doesn't matter which direction the bearing is installed. This feature can prevent misinstallation of the bearing, for example.

Cylindrical sections 114 and 120 includes respective apertures 122 and 124 for radial flow of a lubricant. That is, the apertures allow a lubricant (e.g., oil) to flow through the cylindrical sections to lubricate rolling elements 112, for example. Cage half 104 includes cylindrical section 126 and cage half 106 includes cylindrical section 128, axially overlapping the cylindrical section 126. By axially overlapping, we mean that a line drawn normal to a central axis of bearing 100 passes through both of sections 126 and 128. Although section 128 is shown radially outside of section 126 in FIGS. 1-2, other embodiments (not shown) may include section 128 radially inside of section 126, for example.

Cylindrical section 126 includes depressed portion, or retention feature, 130 for securing cylindrical section 126 to cylindrical section 128. Depressed portion 130 may be formed prior to assembly of the bearing cage and snapped onto section 128, or the depressed portion may be formed after assembly of the bearing cage using a staking tooling, for example. Cage assembly 102 may include multiple retention features 130 as shown in FIGS. 1-2, the two cage halves may be secured together by a circular flange (not shown). By securing the cage halves together, a complete assembly (including rolling elements 112) can be provided for installation in a larger assembly, for example. This adds robustness to the bearing for shipping and assembly purposes, for example.

As shown in FIGS. 1-2, cylindrical sections 114 and 120 are radially outer cylindrical sections and cylindrical sections 126 and 128 are radially inner cylindrical sections. It should also be noted that sections 114 and 120 are radially outside of rolling elements 112, and cylindrical sections 126 and 128 are radially inside of rolling elements 112. Cylindrical sections 114 and 120 include distal ends 132 and 134, respectively, with respective radially extending flanges 136 and 138. As shown in FIGS. 1-2, flanges 136 and 138 extend radially outwardly but another embodiment (e.g., the alternative embodiment with a shaft bore described above) may include flanges 136 and 138 extending radially inwards.

Radius portion 140 connects radially extending flange 136 to distal end 132 and radius portion 142 connects radially extending flange 138 to distal end 134. The radius portions are arranged for providing a lead in to align the cylindrical sections with the shafts. In other words, during assembly of the bearing with a shaft, the radius portion corrects a slight misalignment between the bearing and the shaft. The effect of the correction is enhanced when the bearing is installed on a shaft having an end chamfer, for example.

As shown in FIGS. 1-2, cylindrical section 114 extends in axial direction 144 and cylindrical section 120 extends in axial direction 146, opposite axial direction 144. Similarly, cylindrical section 126 extends in axial direction 146 and cylindrical section 128 extends in axial direction 144. Annular section 108 is axially spaced away from annular section 116 to create an annular gap therebetween. Spacing sections 108 and 116 away from one another provides better positioning of rolling elements 112 and creates a reservoir for lubricant introduced through lubricant channels described below.

Cage half 104 includes annular portion 148 connecting annular section 108 with cylindrical section 114, and cage half 106 includes annular portion 150 connecting annular section 116 with cylindrical section 120. Annular portion 148 includes annular surface 152 contacting cage half 106 and annular portion 150 includes annular surface 154 contacting cage half 104. As shown in FIGS. 1-2, annular surfaces 152 and 154 contact one another. Radial lubricant channels 156 are formed between pairs of annular portions 148 and radial lubricant channels 158 are formed between pairs of annular portions 150. As described above, channels 156 and 158 provide lubricant to the annular gap between annular sections 108 and 116 and directly to rolling elements 112.

In other words, a plurality of circumferentially spaced annular portions 148 include radial lubricant channels 156 therebetween and a plurality of circumferentially spaced annular portions 150 include radial channels 158 therebetween. Although FIGS. 1-2 show lubricant channels formed in both cage halves, other embodiments (not shown) may include a lubricant channel formed in only one cage half. And, although channels 156 and 158 are shown circumferentially aligned, other embodiments (not shown) may include lubricant channels 158 and 158 circumferentially misaligned.

Bearing 100 includes bearing cage assembly 102 and rolling elements 112 disposed in apertures 110 and apertures 118. As discussed above, the apertures position the rolling elements in the cage. The rolling elements have diameter 160 and apertures 110 and 118 include respective circumferential lengths, less than the diameter. Because the circumferential length of the aperture is less than the diameter of the rolling elements, the rolling elements are retained between the cage halves once the cage assembly is assembled. As discussed above, this provides a more robust assembly of the bearing with a shaft. The rolling elements are arranged to contact respective end faces of the first shaft and the second shaft, providing a friction reduced thrust bearing configuration between the shafts.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Bearing
102 Bearing cage assembly
104 Cage half (first)
106 Cage half (second)
108 Annular section (first)
110 Apertures (first)
112 Rolling elements
114 Cylindrical section (first)
116 Annular section (second)
118 Apertures (second)
120 Cylindrical section (second)
122 Apertures (first)
124 Apertures (second)
126 Cylindrical section (third)
128 Cylindrical section (fourth)
130 Depressed portion
132 Distal end (first cylindrical section)
134 Distal end (second cylindrical section)
136 Radially extending flange (first cylindrical section)
138 Radially extending flange (second cylindrical section)
140 Radius portion (first cylindrical section)
142 Radius portion (second cylindrical section)
144 Axial direction (first)
146 Axial direction (second)
148 Annular portion (first)
150 Annular portion (second)
152 Annular surface (first)
154 Annular surface (second)
156 Lubricant channel (first annular portion)
158 Lubricant channel (second annular portion)
160 Diameter (rolling element)

What is claimed is:

1. A cage assembly for a bearing, comprising:
a first cage half comprising:
a first annular section comprising a first plurality of circumferentially spaced apertures for receiving a plurality of rolling elements; and
a first cylindrical section arranged for positioning the cage assembly on a first shaft;
a second cage half comprising:
a second annular section comprising a second plurality of circumferentially spaced apertures for receiving the plurality of rolling elements; and
a second cylindrical section arranged for positioning the cage assembly on a second shaft, wherein:
the first cage half further comprises a first annular portion connecting the first annular section with the first cylindrical section, the first annular portion comprising a first annular surface contacting the second cage half; or
the second cage half further comprises a second annular portion connecting the second annular section with the second cylindrical section, the second annular portion comprising a second annular surface contacting the first cage half; and
the first annular portion comprises a plurality of circumferentially spaced first annular portions with radial lubricant channels therebetween; or
the second annular portion comprises a plurality of circumferentially spaced second annular portions with radial lubricant channels therebetween.

2. The cage assembly of claim 1 wherein the first cylindrical section or the second cylindrical section comprises an aperture for radial flow of a lubricant.

3. The cage assembly of claim 1 wherein:
the first cage half comprises a third cylindrical section; and
the second cage half comprises a fourth cylindrical section, axially overlapping the third cylindrical section.

4. The cage assembly of claim 3 wherein a one of the third cylindrical section or the fourth cylindrical section comprises a depressed portion for securing the one of the third cylindrical section or the fourth cylindrical section to the other of the third cylindrical section or the fourth cylindrical section.

5. The cage assembly of claim 3 wherein:
the first cylindrical section and the second cylindrical section are radially outer cylindrical sections; and
the third cylindrical section and the fourth cylindrical section are radially inner cylindrical sections.

6. The cage assembly of claim 5 wherein the first cylindrical section or the second cylindrical section comprises a distal end with a radially extending flange.

7. The cage assembly of claim 6 further comprising a radius portion connecting the radially extending flange to the distal end, wherein the radius portion is arranged for providing a lead in to align the first cylindrical section with the first shaft or to align the second cylindrical section with the second shaft.

8. The cage assembly of claim 3 wherein:
the first cylindrical section extends in a first axial direction and the second cylindrical section extends in a second axial direction, opposite the first axial direction.

9. The cage assembly of claim 8 wherein:
the third cylindrical section extends in the second axial direction; and
the fourth cylindrical section extends in the first axial direction.

10. The cage assembly of claim 1 wherein the first annular section is axially spaced away from the second annular section to create an annular gap therebetween.

11. A bearing comprising:

a cage assembly of claim 1; and the plurality of rolling elements are disposed in the first plurality of circumferentially spaced apertures and the second plurality of circumferentially spaced apertures.

12. The bearing of claim 11 wherein:

each one of the plurality of rolling elements comprises a diameter;

each of the first plurality of circumferentially spaced apertures comprises a respective circumferential length, less than the diameter; and each of the second plurality of circumferentially spaced apertures comprises a respective circumferential length, less than the diameter.

13. The bearing of claim 11 wherein the plurality of rolling elements are arranged to contact respective end faces of the first shaft and the second shaft.

14. The bearing of claim 11 wherein the plurality of rolling elements are cylindrical rollers or needle rollers.

15. A cage assembly for a bearing, comprising:

a first cage half comprising:

a first annular section comprising a first plurality of circumferentially spaced apertures for receiving a plurality of rolling elements;

a first cylindrical section arranged for positioning the cage assembly on a first shaft; and a first annular portion connecting the first annular section with the first cylindrical section, the first annular portion comprising a first annular surface a second cage half comprising:

a second annular section comprising a second plurality of circumferentially spaced apertures for receiving the plurality of rolling elements;

a second cylindrical section arranged for positioning the cage assembly on a second shaft; and a second annular portion connecting the second annular section with the second cylindrical section, the second annular portion comprising a second annular surface contacting the first annular surface, wherein:

the first annular portion comprises a plurality of circumferentially spaced first annular portions with radial lubricant channels therebetween; and the second annular portion comprises a plurality of circumferentially spaced second annular portions with radial lubricant channels therebetween.

* * * * *